United States Patent
Wang et al.

(10) Patent No.: US 12,015,469 B2
(45) Date of Patent: Jun. 18, 2024

(54) ANTENNA BEAM MANAGEMENT ASSISTED BY SPATIAL AND TEMPORAL MEASUREMENTS OF WIRELESS TERMINAL

(71) Applicant: ZEKU TECHNOLOGY (SHANGHAI) CORP., LTD., Shanghai (CN)

(72) Inventors: Yuanye Wang, San Diego, CA (US); Yanming Wang, San Diego, CA (US)

(73) Assignee: ZEKU TECHNOLOGY (SHANGHAI) CORP., LTD., Shanghai (CN)

(*) Notice: Subject to any disclaimer, the term of this patent is extended or adjusted under 35 U.S.C. 154(b) by 31 days.

(21) Appl. No.: 18/156,620

(22) Filed: Jan. 19, 2023

(65) Prior Publication Data
US 2023/0155665 A1   May 18, 2023

Related U.S. Application Data

(63) Continuation of application No. PCT/US2021/021180, filed on Mar. 5, 2021.

(60) Provisional application No. 63/057,797, filed on Jul. 28, 2020.

(51) Int. Cl.
H04B 7/06 (2006.01)
H04B 7/08 (2006.01)

(52) U.S. Cl.
CPC ......... *H04B 7/0695* (2013.01); *H04B 7/0634* (2013.01); *H04B 7/0834* (2013.01)

(58) Field of Classification Search
CPC .. H04B 7/0695; H04B 7/0634; H04B 7/0834; H04B 7/0617
See application file for complete search history.

(56) References Cited

U.S. PATENT DOCUMENTS

| | | |
|---|---|---|
| 8,706,131 B2 | 4/2014 | Winters |
| 10,523,281 B2 | 12/2019 | Wilson et al. |
| 2006/0152410 A1* | 7/2006 | Shi .............. H01Q 1/28 342/359 |
| 2015/0038140 A1 | 2/2015 | Kilpatrick et al. |
| 2015/0264583 A1 | 9/2015 | Sundstrom et al. |

FOREIGN PATENT DOCUMENTS

WO   2019/191318 A1   10/2019

OTHER PUBLICATIONS

International Search Report Mailed Jun. 2, 2021 in Application No. PCT/US2021/021180.
Written Opinion Mailed Jun. 2, 2021 in Application No. PCT/US2021/021180.

* cited by examiner

*Primary Examiner* — David S Huang
(74) *Attorney, Agent, or Firm* — PERKINS COIE LLP

(57) ABSTRACT

A method performed by a beam management system that obtains spatial and temporal measurements of a mobile terminal and geolocation information of an associated base station on a wireless communication network. The system determines a phase compensation value for the mobile terminal based on the obtained information, which is used to calculate or select coefficients for antenna elements that form an optimal antenna beam. Thus, the system can perform beam switching quickly and efficiently based on predicted spatial or temporal characteristics of the mobile terminal without needing to wait for actual beam measurements.

20 Claims, 7 Drawing Sheets

ANTENNA BEAM MANAGEMENT ASSISTED BY SPATIAL AND TEMPORAL MEASUREMENTS OF WIRELESS TERMINAL

CROSS-REFERENCE TO RELATED APPLICATION(S)

This application is a continuation application of PCT Application No. PCT/US2021/021180, filed on Mar. 5, 2021, which claims priority to U.S. Provisional Application No. 63/057,797, titled "Inertial Measurement Unit, GPS and Application Processor Assisted Antenna Beam Management in Wireless Terminals," filed on Jul. 28, 2020, the content of which is incorporated herein in its entirety.

TECHNICAL FIELD

The disclosed teachings relate to wireless communication systems, particularly improvements in antenna beam management.

BACKGROUND

Beamforming is a signal processing technique used in sensor arrays for directional signal transmission or reception. That is, beamforming is used at transmit or receive ends in order to achieve spatial selectivity. For example, beamforming can focus signals toward a specific direction. This is achieved by combining antenna elements in such a way that signals at particular angles experience constructive interference while others experience destructive interference.

In the context of wireless communication systems, beamforming is used to boost wireless signal strength by confining signal transmission within a beam. The direction of the beam is properly chosen to maximize the antenna gain between a transmitter and a receiver. In such systems, a device such as a wireless mobile terminal or base station needs to periodically perform measurements on different beams in order to select a best beam with which to operate. A beamformer weights all antenna elements with equal magnitudes and steers to a specified direction only by selecting appropriate phases for each antenna. The directivity of the beam improves over omnidirectional reception or transmission.

However, the performance improvements of beamforming come with tradeoffs because performing measurements on all beams consumes battery power and increases latency to identify an optimal beam. In addition, transmission quality is compromised while searching for an optimal beam. Moreover, in high mobility scenarios, the optimal beam may change frequently and continuously over time such that by the time an optimal beam is identified (based on measurements on all beams), the selected beam may no longer be the optimal beam. This also prevents the use of narrow beams and limits the maximum data rate that can be achieved in high-mobility scenarios.

BRIEF DESCRIPTION OF THE DRAWINGS

Embodiments of the present technology will be described and explained through the use of accompanying drawings.

Figure 1:
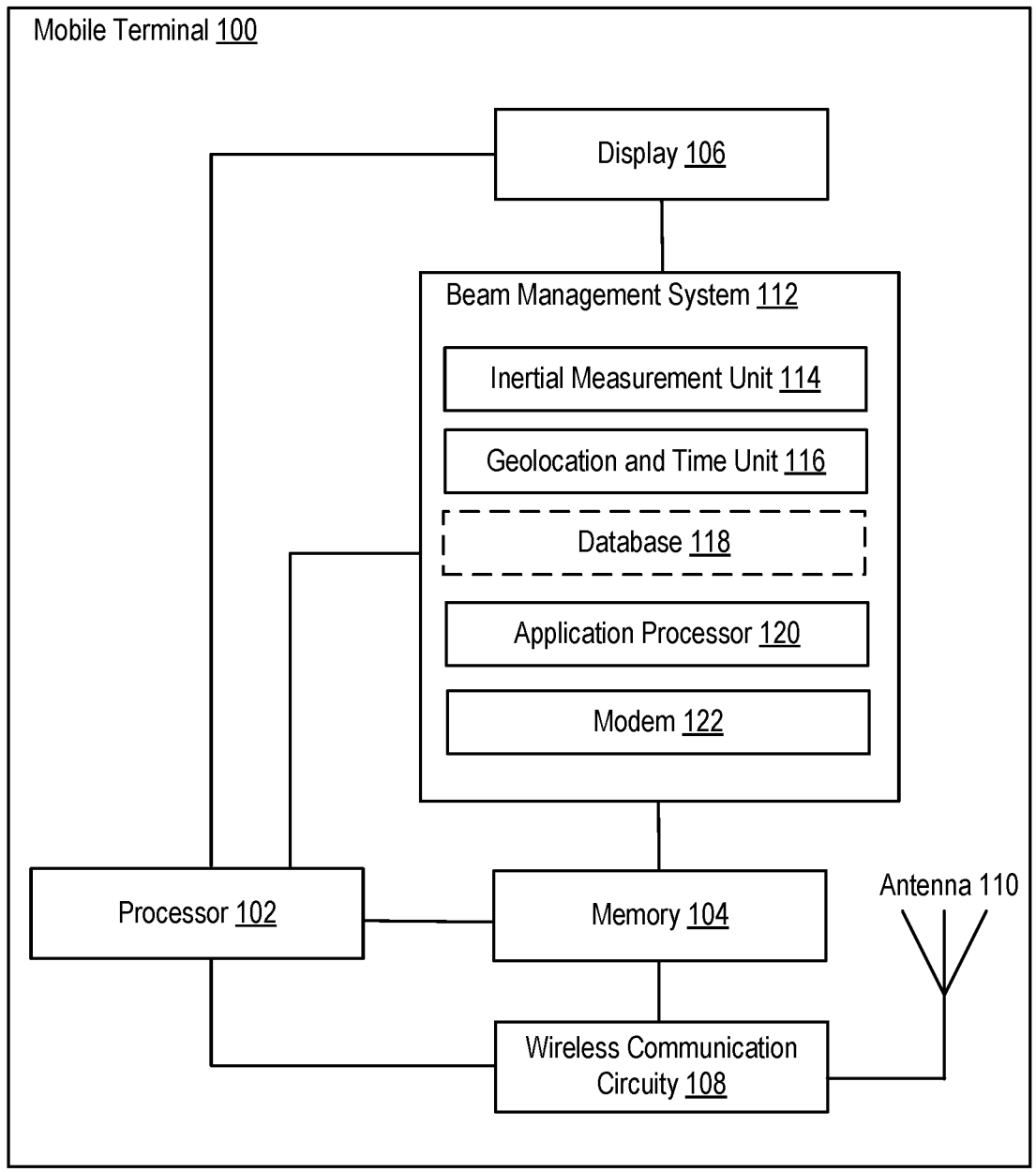
FIG. 1 is a block diagram that illustrates components of a mobile terminal.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed solution relates to an antenna beam management system ("system") that is assisted based on spatial and temporal measurements of a mobile terminal (also referred to herein as a "wireless terminal") in a wireless communication system. The spatial and temporal measurements include rotation and movement of the mobile terminal (MT) and/or geolocation of the MT and/or an associated base station (BS). The system includes an inertial measurement unit (IMU), a geolocation and time unit (GTU), and a database that stores geolocation information of one or more BSs. The MT includes the IMU and/or GTU whereas the BS database resides locally at the MT or a connected BS. An application processor (AP) of the MT can access the geolocation information of the BS over the communication system and store the information locally for use when performing beam management.

The system allows the MT to compensate for a phase change without needing to sweep through all possible beams, which is otherwise both time and power consuming. Thus, the system reduces the latency normally associated with beam selection and improves end user experience accordingly. This improvement is particularly critical for wireless communication systems that rely on antenna beamforming to improve performance such as with millimeter wave signals in 5th-generation (5G) new radio (NG), which is a broadband cellular network standard for wireless telecommunication systems. Another example is 4th-generation (4G) Long Term Evolution (LTE), which is a predecessor of 5G. For example, many 5G MTs also have a 4G LTE capability for locations where 5G access is not available.

Although described mainly in the context of wireless telecommunication systems, implementations can include other wireless communications systems that employ beamforming (e.g., any beamformer). For example, any millimeter wave network in which an access point or wireless endpoint device performs beam management can benefit from the disclosed system.

The disclosed system improves or replaces radio measurement-based beam management performed by a beamformer. Beam management has phases including beam sweeping, beam measuring, beam determination, beam reporting, and beam failure recovery. An MT needs to "sweep" through all beams to measure a respective signal quality. The beam sweeping phase involves transmitting beams in all predefined directions in a burst at a regular interval. The process can repeat periodically in predefined directions (beams) for selected time windows.

In the beam measurement and determination phases, the beamformer performs beam monitoring including measuring all the beams. The MT decides which beam is currently the optimal one to then switch to that beam. The beam measurement is typically based on a synchronization signal while in idle mode or based on reference signals while in connected mode. The optimal beam is searched periodically and identified based on measurement results. The periodicity and time/frequency offsets of measurement windows is configurable.

As such, the beamformer can regularly update selection of an optimal antenna beam (e.g., having the strongest signal and/or lowest interference) based on measurements of beams in different directions. To mitigate inefficiencies, it is of vital importance to properly choose the beamforming pattern. In the beam reporting phase, the MT notifies a connected BS of the selected optimal beam. Finally, during the beam failure recovery phase, when the MT experiences a poor channel condition, the MT receives an indication of a beam failure and starts a procedure to re-select an optimal beam.

There are many downsides of radio measurement-based beam management procedures that are used to update an optimal beam. For example, beam quality monitoring is computationally complex and consumes power. An MT can experience service interruption because data transmission/reception is suspended to perform the measurements of all beams. Moreover, the MT can experience poor signal quality during a beam adaptation period before a new beam is selected. In addition, suboptimal beam selection can occur due to a processing delay of beam quality monitoring. For example, if a mobility or rotation rate of an MT is relatively high, the selected beam based on a measurement may quickly become outdated and not suitable for communications. This prevents using narrow beams in high mobility scenarios.

FIG. 1 is a block diagram that illustrates components of an MT 100. The components shown in FIG. 1 are illustrative and some well-known components are omitted for brevity. As shown, the MT 100 includes a processor 102, a memory 104, a display 106, and wireless communication circuitry 108 coupled to an antenna 110, which are connected to a beam management system 112 ("system 112"). The wireless communication circuitry 108 is designed to establish wireless communication channels on a wireless communication network.

The processor 102 can have generic characteristics similar to general-purpose processors, or the processor 102 may be an application-specific integrated circuit (ASIC) that provides arithmetic and control functions to the MT 100. While not shown, the processor 102 may include a dedicated cache memory. The processor 102 can be coupled to all components of the MT 100, either directly or indirectly over a bus (not shown), for data communication.

The memory 104 includes a suitable type of storage device such as, for example, a static random-access memory (SRAM), dynamic random-access memory (DRAM), electrically erasable programmable read-only memory (EEPROM), flash memory, latches, and/or registers. In addition to storing instructions which can be executed by the processor 102, the memory 104 can store data generated by the processor 102 (e.g., when executing modules of the system 112). The illustrated memory 104 is merely an abstract representation of a storage environment; hence, the memory 104 is comprised of one or more actual memory chips or modules.

An example of the display 106 includes a touch-enabled display or a non-touch-enabled display, in which case the MT 100 likely also includes (or is connected to) an input device such as a keypad. The wireless communication circuitry 108 forms and/or communicate with a network for data transmission among computing devices, such as personal computers, mobile phones, and computer servers, or network nodes. The wireless communication circuitry 108 can be used for communicating with these computing devices or for connecting to a higher-level network (e.g., a LAN) or the Internet. Examples of wireless communication circuitry 108 include Bluetooth, Z-Wave, ZigBee, and the like. In one example, the connection established by the wireless communication circuitry 108 is bootstrapped by a near field communication (NFC) connection. The antenna 110 includes one or more antenna elements that are configurable in accordance with antenna coefficients for beamforming.

The system 112 could be comprised of software, firmware, and/or hardware components implemented in, or accessible to, the MT 100. For convenience, the system 112 is shown to include one or more units. The term "unit" (also referred to herein as a "module") refers broadly to software components, firmware components, and/or hardware components. Accordingly, aspects of the system 112 are implemented in software, firmware, and/or hardware. In one example, modules can reside on the memory 104.

The system 108 includes an IMU 114, a GTU 116, a database (DB) 118, an AP 120, and a modem 122. As shown, the modules are components of the beam management system 112. Alternatively, any of the modules can be logically separate from and coupled to the beam management system 112. For example, the DB 118 can reside at a BS connected to the MT 100 over a communications network. As such, the MT 100 can access the remote DB 118 to retrieve and store geolocation information of a BS in local cache. Together, the modules enable beam management that is more efficient compared to existing techniques as described further below.

The IMU 114 can include one or more devices that report spatial and temporal measurements of the MT 100. For example, the IMU 114 can report values of force, angular rate, and/or orientation of the MT 100 as output by sensors including one or more accelerometers, gyroscopes, or magnetometers. The measurements output by the combination of sensors are processed to calculate current spatial or temporal characteristics of the MT 100 or predict them for the immediate future. At least some components of the IMU 114 are commonly available in modern smartphones and other mobile devices with wireless connectivity.

The GTU 116 acquires a current geolocation of the MT 100. In one example, the GTU 116 includes a global positioning system (GPS) subsystem that calculates the current geolocation based on signals received from navigation satellites and can synchronize a time of the MT 100 with the GPS. As such, the system 112 can also calculate spatial or temporal parameters including a velocity of the MT 100.

At least some components of the GTU 116 is commonly available in modern smartphones and navigational devices.

The DB 118 stores geolocation information of one or more BSs. The DB 118 can reside locally (as shown) or remotely at one or more BSs or on a server of a cloud infrastructure that is accessible by the MT 100 over a communications network. The MT 100 can cache the BS geolocation information locally to subsequently perform beam management.

The AP 120 includes a computing unit to process and/or store spatial or temporal information of the MT 100. In some instances, the AP 120 can process input/output of a user. The AP module 100 can access, process, and record a geolocation of a BS currently connected to the MT 100. The geolocation information is obtained from a DB 118. In one implementation, the AP 120 includes a processor that has generic characteristics or is an ASIC that provides arithmetic and control functions to the MT 100. The AP 120 can include a dedicated cache memory. The AP 120 is coupled to the other components of the system 112 to obtain spatial and temporal measurements and perform beam management based on that information. For example, the AP 120 obtains geolocation, mobility, and/or rotation information from the IMU 114, GTU 116, and/or the DB 118. The AP 120 can then compute a phase compensation value and passes that value to the modem 122, which uses the value to update a beamforming configuration of the antenna 110.

The system 112 improves beamforming to boost wireless signal strength by confining signal transmissions within an optimal beam. The direction of the beam is selected to maximize the antenna gain between a transmitter and an intended receiver. The improved beamforming minimizes the magnitude of the signals received at receivers that are not intended to communicate with the transmitter. Doing so helps to minimize interference and improve security.

Figure 2:
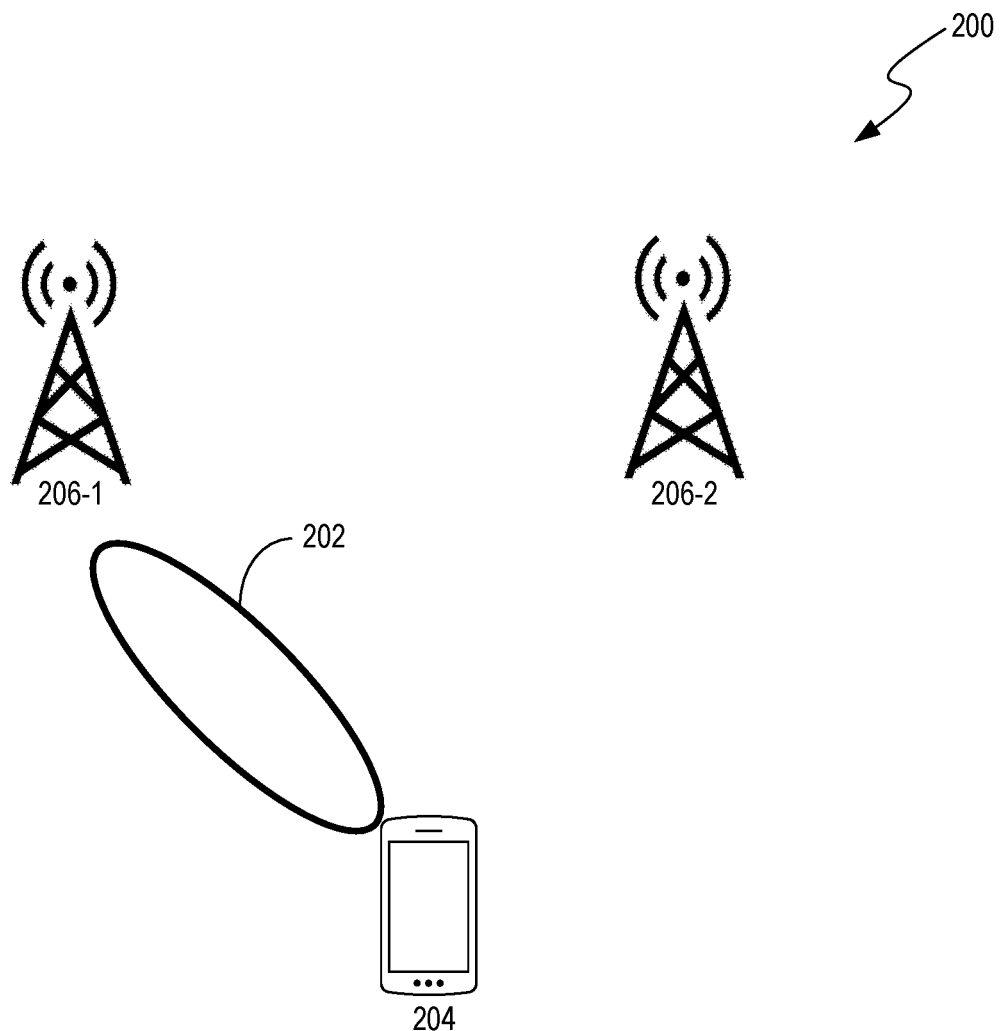
FIG. 2 is a system diagram that illustrates an example of beamforming in a wireless communication system.

FIG. 2 is a system diagram that illustrates an example of beamforming in a wireless communication system 200. The figure illustrates the benefit of using beamforming to boost the strength of signals in beam 202 between a MT 204 and a BS 206-1 while at the same time reducing interference relative to a neighboring BS 206-2. When beamforming is employed, the strength of the signals is boosted along the selected beam 202 of an antenna pattern. Although the BS 206-2 may detect the signals of the beam 202, the amplitude is sufficiently weak to avoid meaningful interference. In contrast, in an omni-directional antenna design, the signals emitted among the MT 204, the BS 206-1, and the BS 206-2 would interfere with each other.

Figure 3:
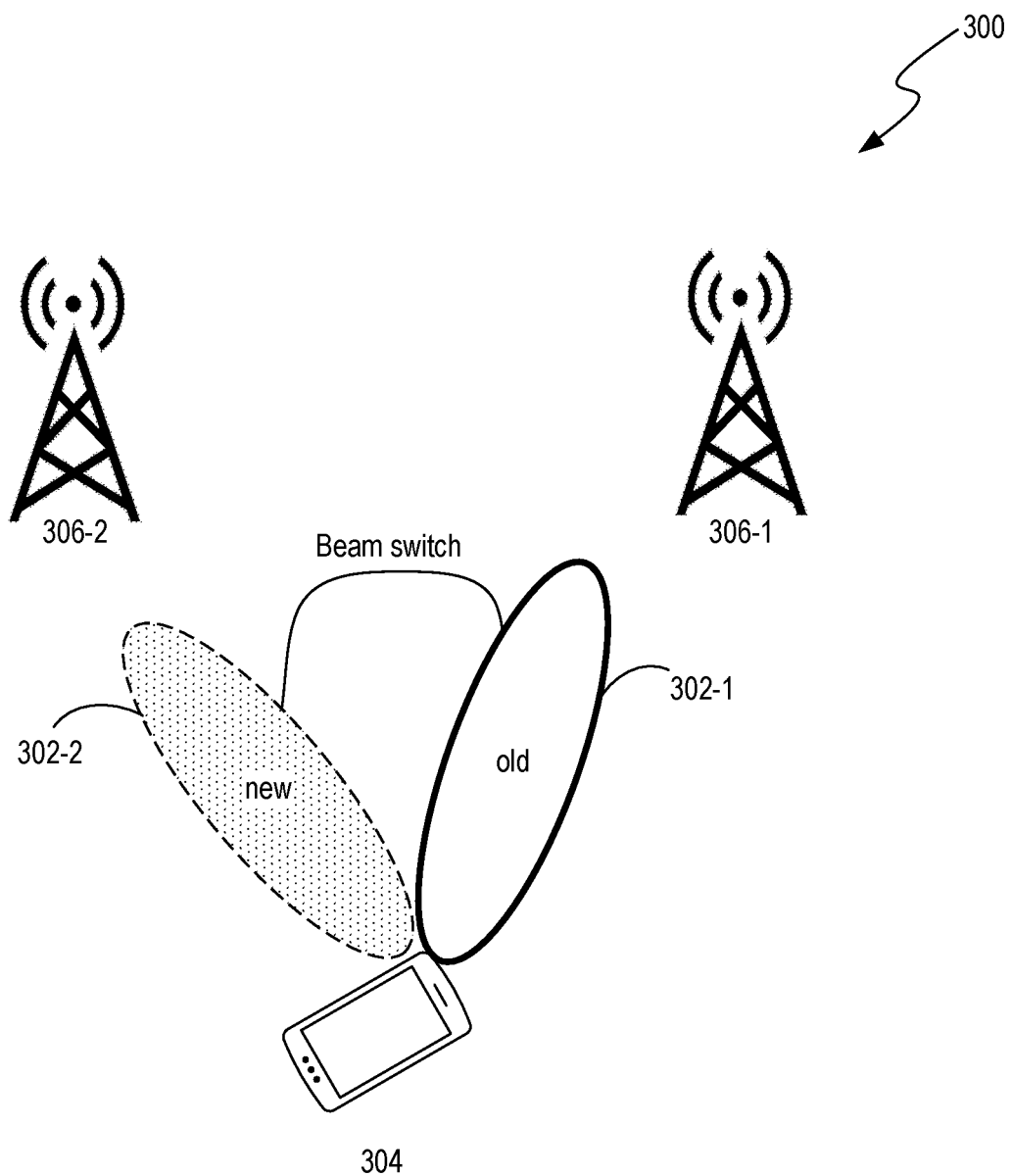
FIG. 3 is a system diagram that illustrates an example of beam switching due to rotation of a mobile terminal in a wireless communication system.

FIG. 3 is a system diagram that illustrates an example of beam switching caused by rotation of an MT 304 in a wireless communication system 300. In the illustrated example, an MT 304 initially measures the signal strength and selects an antenna beam 302-1 as the best beam for connecting to the wireless communication system 300 via a BS 306-1. As the MT 304 rotates, the previously selected antenna beam 302-1 is no longer optimal for connecting to the wireless communication system 300. The MT 304 then performs updated measurements to select a new best beam, and switches to an antenna beam 302-2 oriented to a BS 306-2. A rapid update to the antenna beam 302-2 is required to ensure an uninterrupted and consistent connection to the wireless communication system 300.

Figure 4:
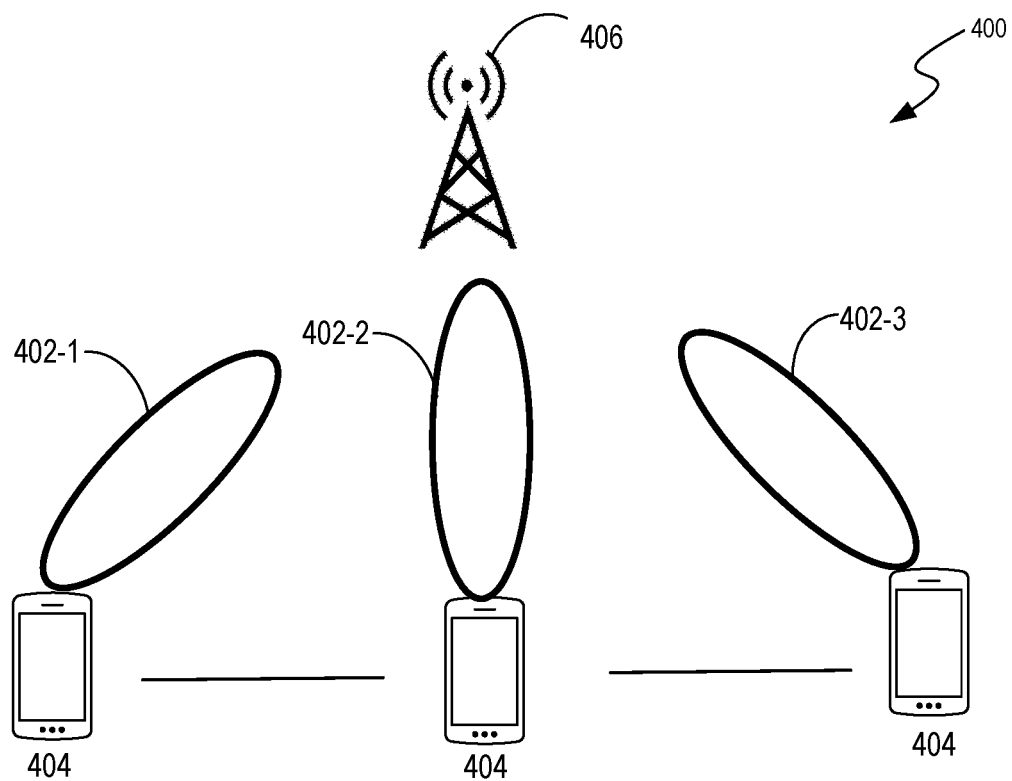
FIG. 4 is a system diagram that illustrates an example of beam switching due to movement of a mobile terminal in a wireless communication system.

FIG. 4 is a system diagram that illustrates an example of beam switching in a wireless communication system 400 caused by moving an MT 404. The location of the MT 404 relative to a BS 406 changes as the MT 404 moves to the right. As such, a suitable antenna beam needs to adapt to suite the instantaneous position of the MT 404. In the illustrated example, an MT 404 initially measures signal strength and selects an antenna beam 402-1 as the optimal beam for connecting to the wireless communication system 400. As the MT 404 moves further to the right, the previously selected antenna beam 402-1 is no longer optimal for connecting to the wireless communication system 400. The MT 404 performs updated measurements to select a new optimal beam, and switches to an antenna beam 402-2 oriented in a different but connected to the same BS 406, and again switches to an antenna beam 402-3 as the MT 404 continues to move to the right.

Figure 5:
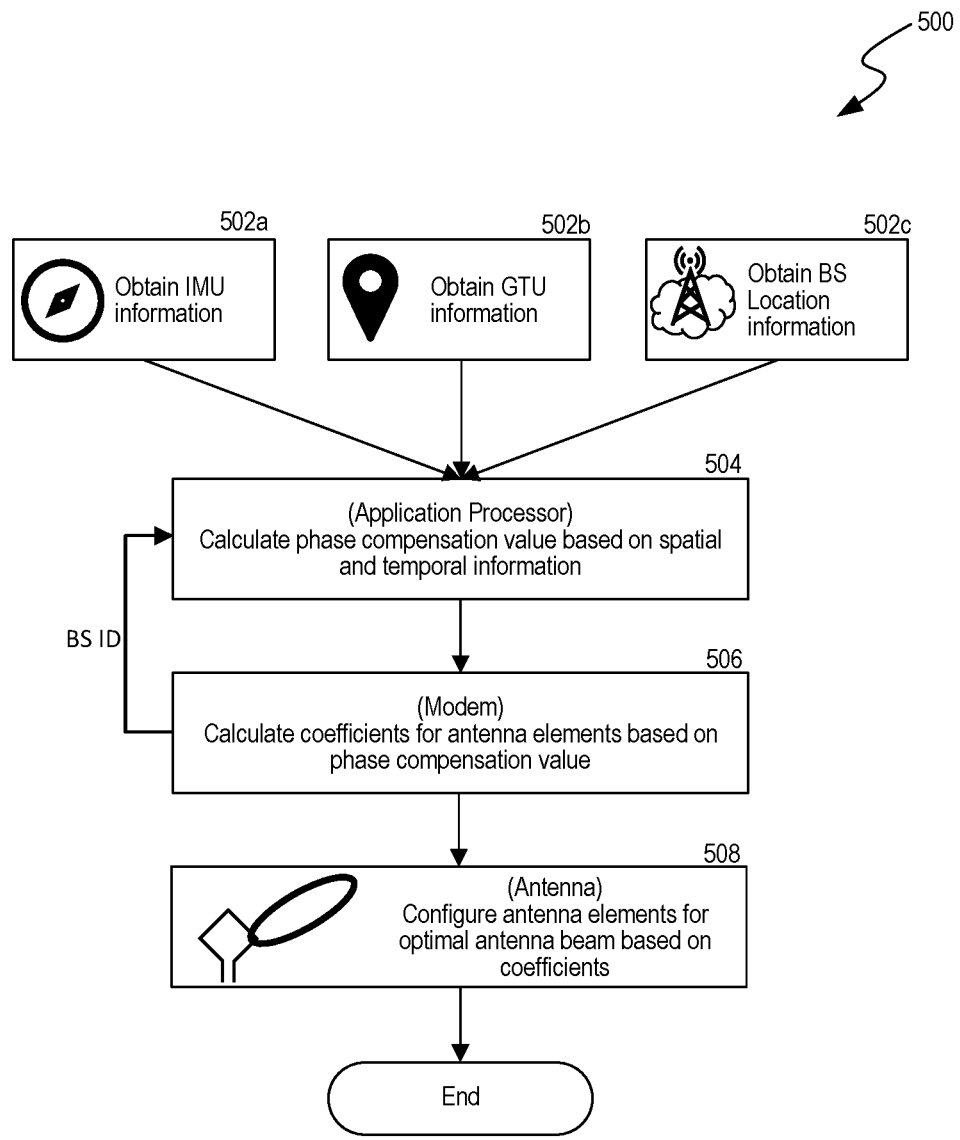
FIG. 5 is a flowchart of a process performed by a beam management system assisted by spatial and temporal measurements of a mobile terminal.

FIG. 5 is a flowchart that illustrates a process performed by a beam management system ("system") to select an optimal antenna beam based in part on spatial and temporal measurements of a MT. The process 500 can augment or replace existing radio measurement-based beam management processes. The system can include a beamformer that considers the spatial and temporal measurements and a geolocation of a BS to which the MT is connected. The spatial and temporal measurements and BS geolocation is processed to calculate an optimal antenna beam at a future time based on an expected movement and geolocation of the MT.

At 502a, the system collects IMU information output by one or more sensors of an IMU. Examples of the sensor(s) includes an accelerometer, gyroscope, or magnetometer. The IMU information includes spatial or temporal measurements measured by the sensor(s). Examples include measurements indicative of a current rotation (e.g., direction, orientation), movement (e.g., velocity, acceleration), and/or angular change (e.g., angular rate). The IMU information can be obtained for the horizontal plane and/or vertical plane and is fed to the AP.

At 502b, the system collects GTU information output by one or more sensors of the GTU. Examples of the sensor(s) includes GPS sensors that receive GPS signals transmitted by GPS satellites. The GTU information includes spatial or temporal measurements. Examples includes geolocation information of the MT and a current time. The GTU information is fed to the AP.

At 502c, the system collects geolocation information of one or more BSs. For example, the system can obtain a geolocation of the BS currently servicing the MT. The BS geolocation information is stored in a DB that resides locally at the MT or remotely at a BS or server of a cloud network that is accessible by the MT over a communications network. The MT can cache the BS location information locally to perform beam management rapidly when needed. For example, an application of the MT can keep a record of the geolocation of the connected BS. The BS geolocation information is fed to the AP.

At 504, the AP calculates a phase compensation value. The phase compensation value can include spatial or temporal characteristics predicted for the MT at a selected time in the future. The selected time is chosen based on a time that the prediction is made and a time that a beam switching procedure can complete.

The phase compensation can include measurements of two types of movements indicative of a change in rotation and geolocation of the MT. For the change in rotation, if the MT has rotated x-degrees since the last beam switching and the rotation angle rate is r degree/second, the expected rotation after T time units is $x+r*T_1$. As shown in FIG. 3, the mobile terminal needs to compensate for this rotation as $PhaseComp_0 = -(x+r*T_1)$.

Figure 6:
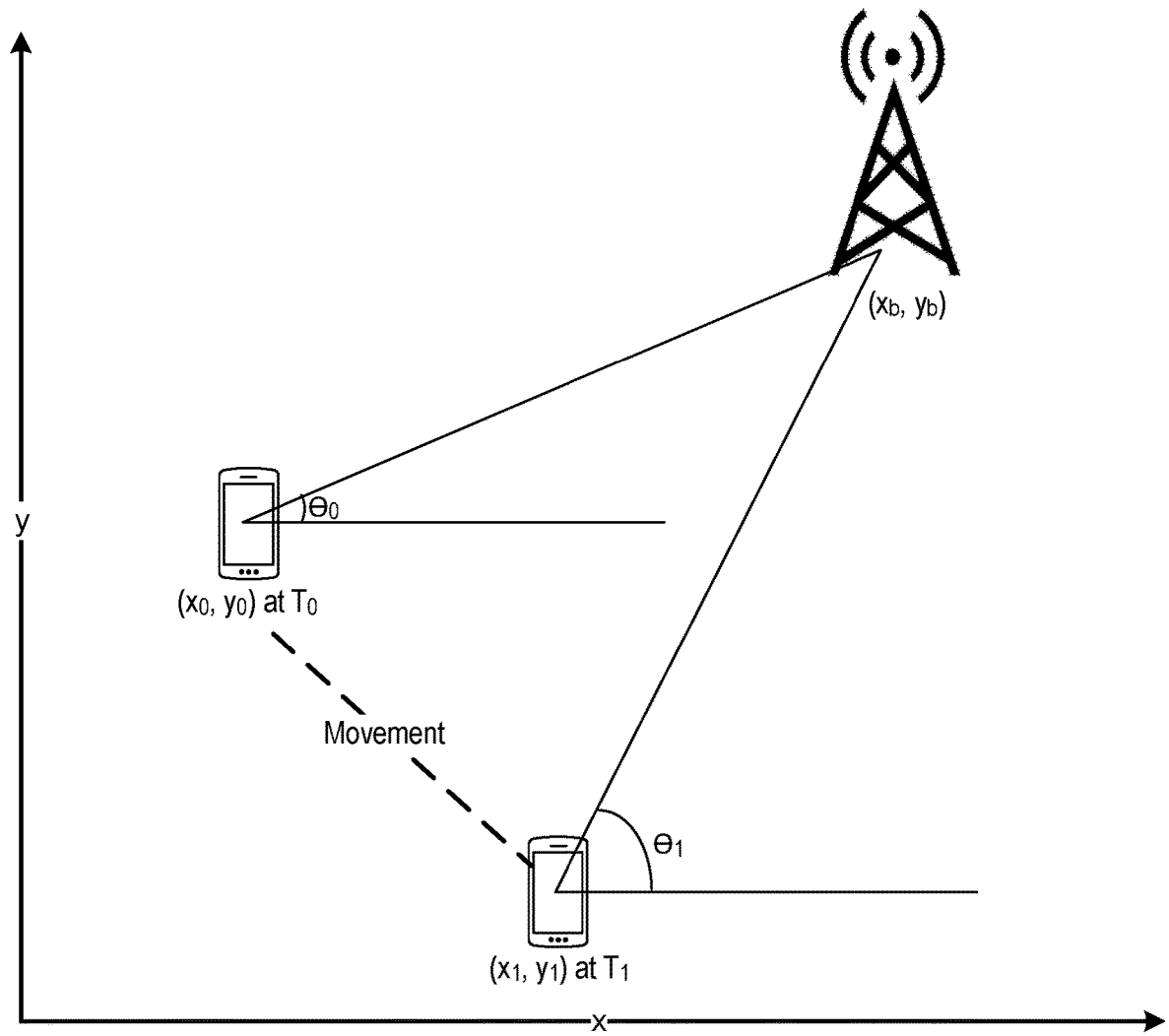
FIG. 6 is a diagram that illustrates phase compensation due to movement of a mobile terminal.

For the change in geolocation, the AP calculates an expected geolocation $(x_1, y_1)$ of the mobile terminal at $T_1$ based on a current geolocation, velocity, acceleration, and/or direction of movement of the MT. The location of the MT is $(x_0, y_0)$ at $T_0$ when the last beam switching occurred. For example, FIG. 6 is a diagram that illustrates the process to compute the phase compensation due to movement of the MT from $(x_0, y_0)$ at $T_0$ to $(x_1, y_1)$ at $T_1$. The movement is shown in azimuth (horizontal) plane; however, the same operations can be performed in the elevation (vertical) plane or any other plane. The phase compensation value at $T_1$ is $PhaseComp_1 = \theta_1 - \theta_0$ where $$\theta_0 = \operatorname{atan}\left(\frac{y_b - y_0}{x_b - x_0}\right)$$

and $$\theta_1 = \operatorname{atan}\left(\frac{y_b - y_1}{x_b - x_1}\right)$$

relative to the geolocation of the BS $(x_b, y_b)$. The AP combines the two types of phase compensation and sends to result to the modem.

At 506, the modem calculates one or more coefficients for antenna elements based on the phase compensation value obtained from the AP. The coefficients are calculated to form a beam directed toward an expected direction. In some embodiments, coefficients are precalculated and, instead, the modem selects a set of coefficients that point to a direction which is closest to the expected direction. A feedback loop from the modem informs the AP of an identifier for a BS which provides network access to the MT. The BS identifier is used to obtain the geolocation of the BS $(x_b, y_b)$. The modem is thus updated with the new coefficients for the antenna elements.

At 508, the antenna applies the new coefficients to form an antenna beam with a direction relative to the expected rotation and geolocation of the MT. As such, the system reduces complexity, reduces power consumption, and avoids service interruption compared to unassisted radio-measurement-based beam switching. The system also increases signal quality by reducing beam switching time and optimizes beam selection by predicting MT movement and rapidly switching beams based on the prediction. Beam selection based on predicted values improves over beam selection based purely on beam measurements, especially in high mobility use cases.

Figure 7:
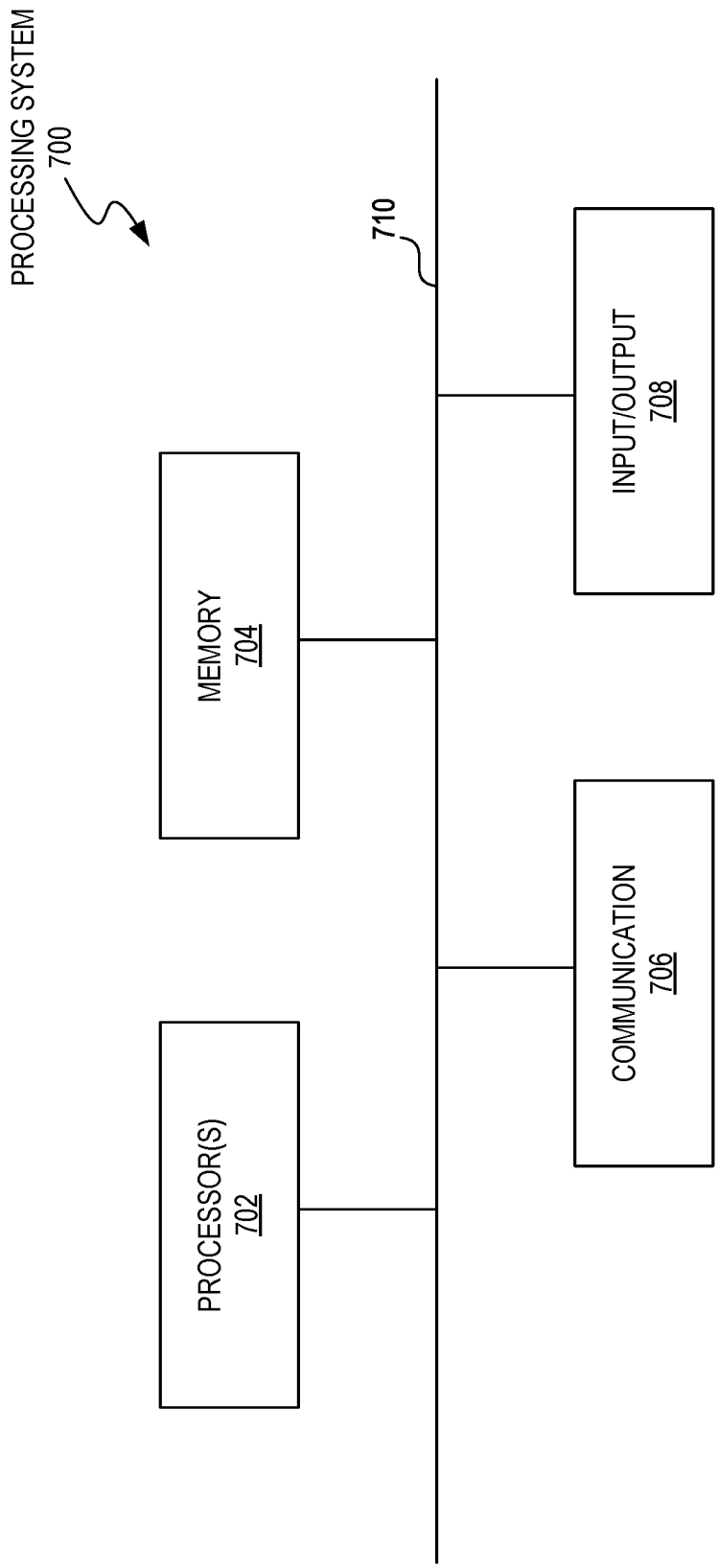
FIG. 7 is a block diagram that illustrates an example of a processing system in which at least some operations described herein can be implemented.

FIG. 7 is a block diagram illustrating an example of a processing system 700 in which at least some operations described herein can be implemented. The processing system 700 represents a system that can run any of the methods/algorithms described herein. For example, any device or component (e.g., unit, module) of the disclosed systems can include or be part of a processing system 700. The processing system 700 can include one or more processing devices, which can be coupled to each other via a network or multiple networks. A network can be referred to as a communication network or telecommunications network.

In the illustrated embodiment, the processing system 700 includes one or more processors 702, memory 704, a communication device 706, and one or more input/output (I/O) devices 708, all coupled to each other through an interconnect 710. The interconnect 710 can be or include one or more conductive traces, buses, point-to-point connections, controllers, adapters and/or other conventional connection devices. Each of the processor(s) 702 can be or include, for example, one or more general-purpose programmable microprocessors or microprocessor cores, microcontrollers, application specific integrated circuits (ASICs), programmable gate arrays, or the like, or a combination of such devices.

The processor(s) 702 control the overall operation of the processing system 700. Memory 704 can be or include one or more physical storage facilities, which can be in the form of random-access memory (RAM), read-only memory (ROM) (which can be erasable and programmable), flash memory, miniature hard disk drive, or other suitable type of storage device, or a combination of such devices. Memory 704 can store data and instructions that configure the processor(s) 702 to execute operations in accordance with the techniques described above. The communication device 706 can be or include, for example, an Ethernet adapter, cable modem, Wi-Fi adapter, cellular transceiver, Bluetooth transceiver, or the like, or a combination thereof. Depending on the specific nature and purpose of the processing system 700, the I/O devices 708 can include devices such as a display (which can be a touch screen display), audio speaker, keyboard, mouse or other pointing device, microphone, camera, etc.

While processes or blocks are presented in a given order, alternative embodiments can perform routines having steps or employ systems having blocks, in a different order, and some processes or blocks can be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks may instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

In one embodiment, a method performed by a beam management system of a wireless communication network includes obtaining spatial and temporal measurements of a mobile terminal connected to a base station of the wireless communication network, obtaining geolocation information of the base station, determining a phase compensation value for an antenna of the mobile terminal at a future time based on an expected rotation and geolocation of the mobile terminal. The phase compensation value is based on the spatial and temporal measurements of the mobile terminal and the geolocation information of the base station. The method further incudes obtaining one or more coefficients for one or more antenna elements of the antenna to select an antenna beam for the future time based on the phase compensation value, and configuring the one or more antenna elements to form the antenna beam in a direction relative to the expected rotation and geolocation of the mobile terminal.

In another embodiment, there is provided a non-transitory computer-readable medium with instructions stored thereon that, when executed by an application processor, cause the application processor to: obtain spatial and temporal measurements of a mobile terminal connected to a base station of a wireless communication network; obtain geolocation information of the base station; determine a future antenna phase relative to a past antenna phase for an antenna of the mobile terminal, wherein the future antenna phase is based on the spatial and temporal measurements of the mobile terminal and the geolocation information of the base station; obtain a phase compensation value based on a difference between the future antenna phase and the past antenna phase; and cause the mobile terminal to configure one or more antenna elements of the antenna to form an antenna beam in accordance with the phase compensation value.

In yet another embodiment, there is provided a beam management system. The system includes an inertial measurement unit (IMU), a geolocation and time unit (GTU), a database, an application processor and a memory. The IMU includes an accelerometer, a gyroscope, or a magnetometer of a mobile terminal, The mobile terminal is connected to a base station of a wireless communication system. The GTU includes a global positioning system (GPS) sensor configured to receive signals transmitted by navigation satellites. The database is configured to store geolocation information of the base station. The memory contains instructions that, when executed by the application processor, cause the system to: determine a phase compensation value for the mobile terminal based the geolocation information of the base station and spatial and temporal information of the mobile terminal wherein the spatial and temporal information is based on output of the IMU and GTU; and cause an antenna of the mobile terminal to form an antenna beam in accordance with the phase compensation value.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 700 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed embodiments can be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a set of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. One will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments. Aspects of the disclosure can be modified, if necessary, to employ the systems, functions, and concepts of the various references described above to provide yet further embodiments of the disclosure.

These and other changes can be made to the invention in light of the above Detailed Description. While the above description describes certain embodiments of the disclosure, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the disclosed techniques should not be taken to imply that the terminology is being redefined herein to be restricted to any specific characteristics, features, or aspects of the disclosed techniques with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the disclosed techniques are presented below in certain claim forms, the inventors contemplate the various aspects of the techniques in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the disclosed techniques.

We claim:

1. A method performed by a beam management system of a wireless communication network, the method comprising:
   obtaining spatial and temporal measurements of a mobile terminal connected to a base station of the wireless communication network;
   obtaining geolocation information of the base station;
   determining a phase compensation value for an antenna of the mobile terminal at a future time based on an expected rotation and geolocation of the mobile terminal,
      wherein the phase compensation value is based on the spatial and temporal measurements of the mobile terminal and the geolocation information of the base station;
   obtaining one or more coefficients for one or more antenna elements of the antenna to select an antenna beam for the future time based on the phase compensation value; and
   configuring the one or more antenna elements to form the antenna beam in a direction relative to the expected rotation and geolocation of the mobile terminal.

2. The method of claim 1, wherein obtaining the spatial and temporal measurements of the mobile terminal comprises:
   determining a current rotation and movement as measured by an accelerometer, a gyroscope, or a magnetometer of the mobile terminal.

3. The method of claim 2, wherein obtaining the spatial and temporal measurements of the mobile terminal comprises:
   calculating a current geolocation of the mobile terminal based on global positioning system (GPS) signals received by the mobile terminal.

4. The method of claim 2, wherein obtaining one or more coefficients for one or more antenna elements comprises:
   selecting, based on the phase compensation value, the one or more coefficients for the one or more antenna elements from among a plurality of precalculated coefficients.

5. The method of claim 1, wherein obtaining the spatial and temporal measurements of the mobile terminal comprises:
   determining a current phase of the mobile terminal at a prior time when a most recent beam switching occurred.

6. The method of claim 1, wherein obtaining the geolocation information of the base station comprises:
   retrieving, over a communications network, the geolocation information of the base station from a database that resides at the base station.

7. The method of claim 1, wherein obtaining geolocation information of the base station comprises:
   retrieving, over a communications network, the geolocation information of the base station from a database that resides at a server of a cloud infrastructure.

8. The method of claim 1, wherein obtaining geolocation information of the base station comprises:
   retrieving the geolocation information of the base station from a database that resides locally at the mobile terminal.

9. The method of claim 1, wherein the phase compensation value compensates for an expected change in rotation and geolocation of the mobile terminal.

10. The method of claim 9, wherein the expected change in rotation includes a magnitude and rate of change.

11. The method of claim 9, wherein the expected change in geolocation is based on a current geolocation, velocity, acceleration, and direction of movement of the mobile terminal.

12. The method of claim 1, wherein obtaining the one or more coefficients for the one or more antenna elements comprises:
calculating, based on the phase compensation value, the one or more coefficients for the one or more antenna elements based on the phase compensation value.

13. A non-transitory computer-readable medium with instructions stored thereon that, when executed by an application processor, cause the application processor to:
obtain spatial and temporal measurements of a mobile terminal connected to a base station of a wireless communication network;
obtain geolocation information of the base station;
determine a future antenna phase relative to a past antenna phase for an antenna of the mobile terminal,
wherein the future antenna phase is based on the spatial and temporal measurements of the mobile terminal and the geolocation information of the base station;
obtain a phase compensation value based on a difference between the future antenna phase and the past antenna phase; and
cause the mobile terminal to configure one or more antenna elements of the antenna to form an antenna beam in accordance with the phase compensation value.

14. The non-transitory computer-readable medium of claim 13, wherein a modem of the mobile terminal is caused to:
calculate, based on the phase compensation value, one or more coefficients to configure the one or more antenna elements for the antenna beam,
wherein the one or more antenna elements are configured based on the one or more coefficients.

15. The non-transitory computer-readable medium of claim 13, wherein a modem of the mobile terminal is caused to:
select, based on the phase compensation value, one or more coefficients to configure the one or more antenna elements for the antenna beam,
wherein the one or more coefficients are selected from a plurality of precalculated coefficients, and wherein the one or more antenna elements are configured based on the one or more coefficients.

16. A beam management system comprising:
an inertial measurement unit (IMU) including an accelerometer, a gyroscope, or a magnetometer of a mobile terminal,
wherein the mobile terminal is connected to a base station of a wireless communication system;
a geolocation and time unit (GTU) including a global positioning system (GPS) sensor configured to receive signals transmitted by navigation satellites;
a database configured to store geolocation information of the base station;
an application processor; and
a memory containing instructions that, when executed by the application processor, cause the system to:
determine a phase compensation value for the mobile terminal based the geolocation information of the base station and spatial and temporal information of the mobile terminal,
wherein the spatial and temporal information is based on output of the IMU and GTU; and
cause an antenna of the mobile terminal to form an antenna beam in accordance with the phase compensation value.

17. The system of claim 16, wherein the database resides at the base station, and the application processor is further caused to:
retrieve, over the wireless communication system, the geolocation information of the base station.

18. The system of claim 16, wherein the database resides at a local memory of the mobile terminal, and application processor is further caused to:
retrieve the geolocation information of the base station from the local memory.

19. The system of claim 16 further comprising:
a modem configured to calculate one or more coefficients of one or more antenna elements of the antenna,
wherein the one or more coefficients are calculated based on the phase compensation value.

20. The system of claim 16 further comprising:
a modem configured to select one or more coefficients for one or more antenna elements of the antenna,
wherein the one or more coefficients are selected, based on the phase compensation value, from a plurality of precalculated coefficients for a plurality of antenna beams.

* * * * *